United States Patent [19]
Ohkubo et al.

[11] Patent Number: 4,551,757
[45] Date of Patent: Nov. 5, 1985

[54] METHOD FOR DRIVING SOLID-STATE IMAGE SENSOR

[75] Inventors: Yoshio Ohkubo; Yoshiaki Sone, both of Osaka; Susumu Hashimoto, Shiga; Kiyotsugu Ishikawa, Osaka; Masanori Omae, Kyoto; Masao Hiramoto, Osaka, all of Japan

[73] Assignee: Matsushita Electric Industrial Co., Ltd., Osaka, Japan

[21] Appl. No.: 436,067

[22] Filed: Oct. 22, 1982

[30] Foreign Application Priority Data

Oct. 22, 1981 [JP] Japan .................................. 56-169870

[51] Int. Cl.⁴ ............................................. H04N 3/14
[52] U.S. Cl. ..................................... 358/212; 358/213
[58] Field of Search ................. 358/213, 212; 250/578

[56] References Cited

U.S. PATENT DOCUMENTS 4,316,221  2/1982  Swab ................................... 358/213
4,366,503 12/1982  Terakawa et al. .................. 358/213

FOREIGN PATENT DOCUMENTS 55-163957 12/1980  Japan .................................. 358/213
56-58379   5/1981  Japan .................................. 358/213

Primary Examiner—Gene Z. Rubinson
Assistant Examiner—Robert G. Lev
Attorney, Agent, or Firm—Burgess, Ryan and Wayne

[57] ABSTRACT

A method for driving a solid-state image sensor in which the bias charges in a horizontal readout CCD (charge-coupled device) shift register are transferred onto vertical signal lines with the signal charges and then the signal and bias charges are transferred back into the horizontal readout CCD shift register from which are read out the signal charges (generated at the photosensor or photodiodes).

5 Claims, 28 Drawing Figures

FIG. 6A
PRIOR ART
FIG. 6B
PRIOR ART
FIG. 6C
PRIOR ART
FIG. 6D
PRIOR ART
FIG. 6E
PRIOR ART
FIG. 6F
PRIOR ART
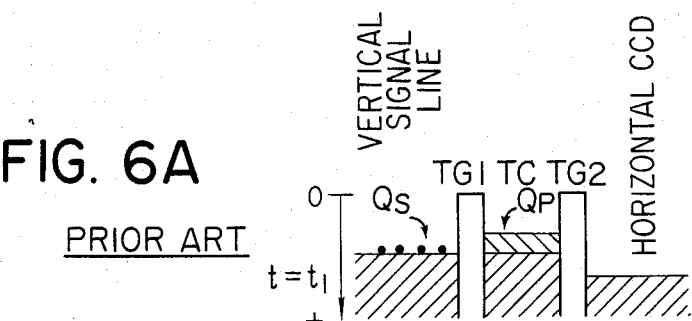
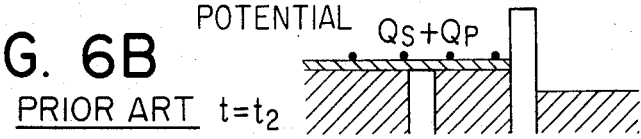
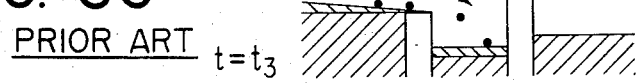
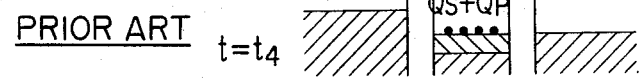
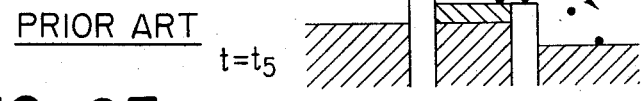
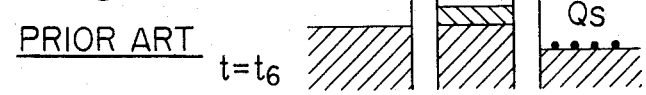

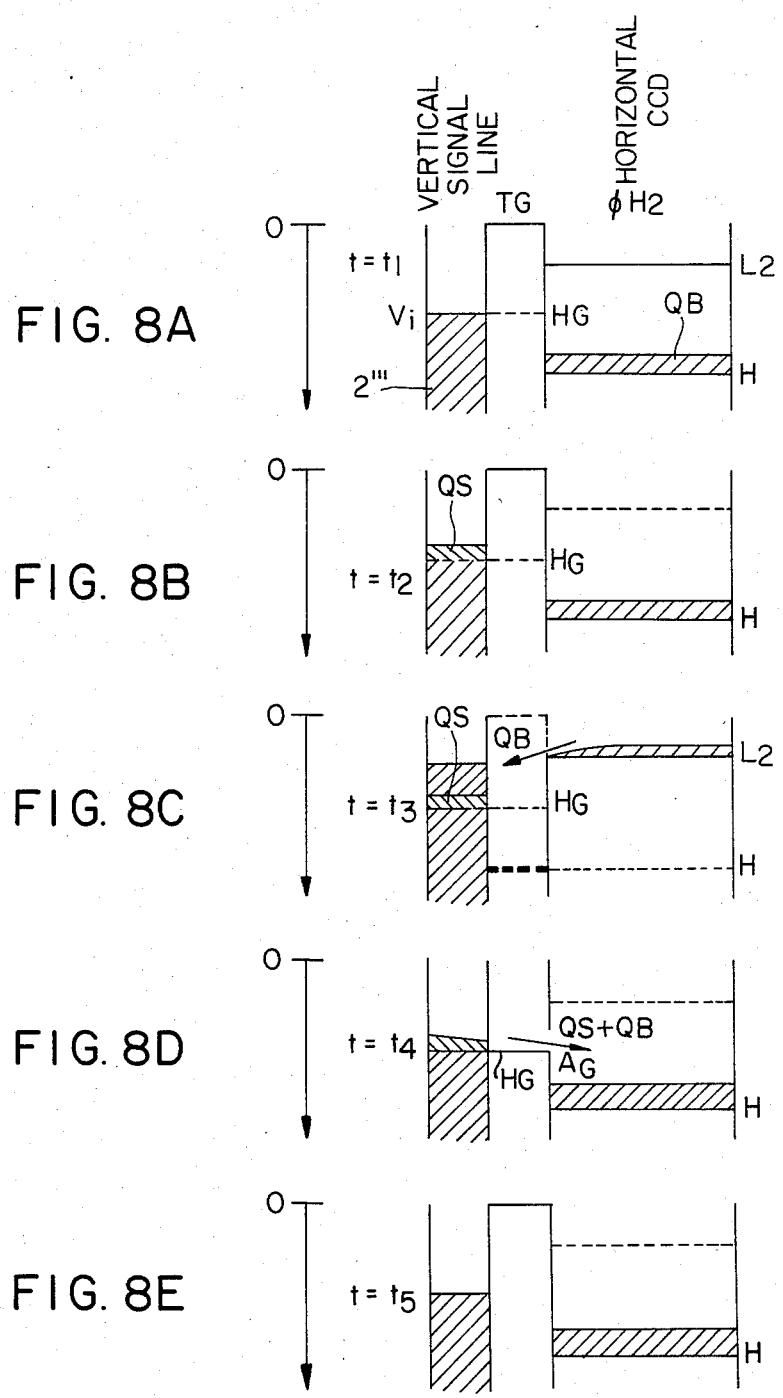

METHOD FOR DRIVING SOLID-STATE IMAGE SENSOR

BACKGROUND OF THE INVENTION

1. Field of the Invention

The present invention relates to a method for driving a solid-state image sensor.

2. Description of the Prior Art

So far a great deal of research-and-development work on various solid-state image sensors has been made so that their performance is now almost equal to or even superior to the conventional single-tube image sensors.

In general, a solid-state image sensor comprises an array of photosensors which converts a pattern of light focused thereupon into a pattern of charges which in turn are stored therein, and a scanning section or stage for scanning the photosensor array, thereby moving the resulting packs of charge to an output terminal.

A photosensor array consists of, for instance, an array of m×n photodiodes each of which is associated with a MOS transistor switch for transferring signal charge onto a vertical signal line. A vertical shift register is provided so that all the MOS transistor switches in each column are turned on and off and when the MOS transistor switch is turned on, it establishes an electrical connection between the associated photodiode and the vertical signal line. The vertical signal lines are connected to a horizontal readout circuit which is adapted to scan the vertical signal lines one column at a time so that the signal charges or packs of charge can be serially transferred onto the horizontal signal output line.

The so-called solid-state image sensor comprises, in general, a horizontal readout circuit consisting of a horizontal shift register for generating the horizontal scanning pulses and an array of switching transistors which are interconnected between the vertical signal lines and the horizontal output signal line and which is controlled by the horizontal shift register. However, the solid-state image sensor of the type just described above has a drawback that noise produced when the horizontal switching transistors are turned on and off results in noise in the form of fixed patterns on the reproduced picture, whereby the reproduced picture quality is greatly degraded.

In order to overcome this drawback, it has been proposed to use a charge-coupled device (to be referred to as "CCD" for brevity in this specification) instead of the above-described type horizontal readout or scanning circuit.

One of the most simple solid-state image sensors of the type employing CCDs is such that the vertical signal lines are connected through transfer gates to a horizontal readout CCD (to be referred to as "the horizontal CCD" for brevity in this specification). With this arrangement, however, one end of each vertical signal line must be connected to an n-type diffused region of a pn junction so that the signal charge on the vertical signal line can be injected into the horizontal CCD. However, since the interior of the diffused region is not influenced by the electric fields, it becomes difficult to transfer the signal charge from the diffused region to other potential wells within a brief time period in an efficient manner. As a consequence it is almost impossible to transfer the signal charge on the vertical signal line to the region immediately below the gate electrode of the horizontal CCD with a transfer efficiency higher than 90% within one third or a quarter of the horizontal blanking period $T_{BLK}$ (about 16.5 microseconds). Therefore, the solid-state image sensor of the type described above has not been successfully used in practice.

In order to overcome the above-described problem, it has been proposed to make an improvement of the transfer stage or section between the vertical signal lines and the horizontal CCD. The transfer section or stage has two gates and one charge storage means for each vertical line so that the signal charge which has been transferred onto the vertical signal line can be efficiently transferred into the horizontal CCD. More specifically, a first gate is turned on so that the charge of a predetermined value (to be referred to as "the internal bias charge $Q_p$" in this specification) is transferred from the charge storage means onto the vertical signal line and added to the signal charge $Q_S$ transferred from the photodiode. Thereafter the signal and internal bias charges $Q_S$ and $Q_p$ are returned back to the associated charge storage means and the first gate is turned off. Next, the second gate is turned on, and the signal charge $Q_S$ is transferred into the horizontal CCD. Because of such improvement of the transfer section or stage as described above, the solid-state image sensors employing CCDs have come to be used in practice, but there is still a problem to be solved. That is, only the signal charge $Q_S$ is transferred from the charge storage means into the horizontal CCD so that if the quantity of the signal charge $Q_S$ is too small, the transfer efficiency is considerably reduced. The degradation in transfer efficiency in turn will result in the degradation of color-separation characteristics with the resultant color mixturing and the like. Moreover, in response to the intensity of the incident light, variations of hue in color occur.

Meanwhile, a small-sized solid-state image sensor of the type employing a bucket bridge device (BBD) as a horizontal scanning circuit is reported in IEE Journal of Solid-State Circuits, Vol. SC-15, No. 2, pp 206-213. In this image sensor, the bias charge is transferred from the BBD to a vertical signal line and added to the signal charge of a small value generated when the intensity of the incident light is low. Thereafter the signal charge plus the bias charge are transferred back into the BBD, thereby attempting to increase the charge transfer efficiency. The "buckets" of the BBD consist of a diffused region or layer so that the control on the voltage on the vertical signal line and on the voltage at the associated "bucket" for the transfer of the charge becomes easy. However, in the case of the conventional television system, about 400 horizontal shift registers must be provided so that the horizontal scanning frequency becomes higher than 7 MHz and consequently the horizontal transfer frequency becomes also higher than 7 MHz. With the BBD, however, it becomes impossible to attain a charge transfer efficiency higher than 99.99% through each of the horizontal shift registers at such high frequency. In addition, the horizontal shift register cannot accomplish the charge transfer operation in response to the continuous clock pulses. As a consequence, in order to otain higher transfer efficiency of signal charge from a vertical signal line into a horizontal shift register, a time period as long as permissible within the horizontal blanking period must be used and during this time period the horizontal shift register must be halted. It follows that it becomes difficult to uniformly inject the signal charges into the stages of the horizontal BBD shift register. As a result, horizontal shading tends to appear in a reproduced television picture over tens of bits from the trailing edge of the horizontal scanning.

Therefore, because of the relationship between the charge transfer speed and the charge transfer efficiency in practical solid-state image sensors, BBD horizontal shift registers cannot be used, but CCD horizontal shift registers must be used.

SUMMARY OF THE INVENTION

The primary object of the present invention is, therefore, to provide an improved method for driving the solid-state image sensor of the type employing CCDs as horizontal scanning circuits, in which the degradation in charge transfer efficiency can be almost eliminated by adding external bias charges so that the high-quality picture may be reproduced.

To attain the above and other ends, the present invention provides a driving method comprising the steps of
 (a) injecting the external bias charges in the same quantity into the stages of a horizontal readout CCD shift register,
 (b) transferring the signal charges from a photosensor array to vertical signal lines,
 (c) transferring the external bias charges from the horizontal readout CCD shift register through a transfer section to the vertical lines, thereby adding them to the signal charges thereon,
 (d) transferring the signal charges plus the external charges thus mixed back into the horizontal readout CCD shift register, and
 (e) driving the horizontal readout CCD shift register, thereby deriving the contents thereof at an output terminal.

The above and other objects, effects and features of the present invention will become more apparent from the following description of preferred embodiments thereof taken in conjunction with the accompanying drawings.

BRIEF DESCRIPTION OF THE DRAWINGS

FIGS. 6A to 6F are views also used for the explanation of the operation of the solid-state image sensor shown in FIG. 3 and show the potential relationships among the vertical signal line, the gate terminals TG1, TC and TG2 and the diffused region or channel immediately below the electrode connected to the driving terminal of the horizontal CCD at time $t=t_1$ through $t_6$;

FIGS. 8A to 8E show the potential relationships among the vertical signal line, the transfer gate and the horizontal CCD at time points corresponding $t_1$ through $t_5$ shown in FIG. 7;

DETAILED DESCRIPTION OF THE INVENTION

A solid-state image sensor element with which the present invention can be used will be described first.

Figure 1:
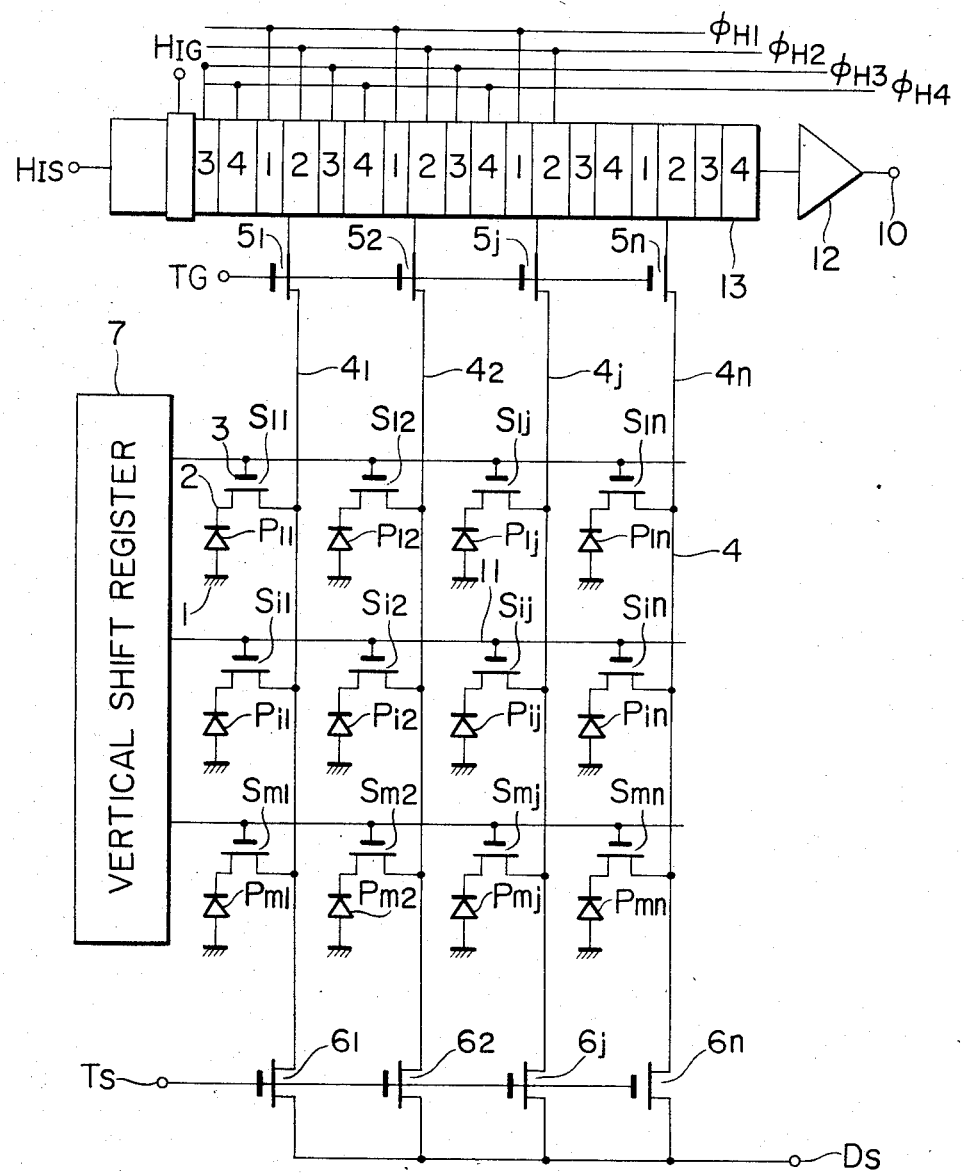
FIG. 1 is a diagrammatic view of a two-dimensional solid-state image sensor to which can be applied a driving method in accordance with the present invention.

In FIG. 1 is shown an example of a solid-state image sensor element with which the present invention can be used. A photosensor array consists of an m×n matrix consisting of photodiodes $P_{11}, P_{12}, \ldots P_{ij}, \ldots,$ and $P_{mn}$, each of which is associated with a MOS transistor switch $S_{11}, S_{12}, \ldots, S_{ij}, \ldots$ or $S_{mn}$. The gate electrodes 3 of the MOS transistor switches S in respective rows are connected in common to respective output terminals of a vertical shift register 7 which serves to generate the vertical scanning clock pulses. The upper ends of vertical signal lines $4_1, 4_2, \ldots,$ and $4_n$ are connected to a horizontal readout CCD shift register 13 (to be referred to as "the horizontal CCD" for brevity in this specification) through a transfer gate consisting of transistor switches $5_1, 5_2, \ldots,$ and $5_n$. The lower ends of the vertical signal lines $4_1, 4_2, \ldots,$ and $4_n$ are connected to a voltage terminal $D_S$ through transistor switches $6_1, 6_2, \ldots,$ and $6_n$. Such arrangement consisting of the voltage terminals $D_S$ and transistor switches $6_1$ to $6_n$ as described is used for the explanation of the prior art operating system so that it is not used in the present invention.

The four-phase drive system is employed to drive the horizontal CCD 13 for charge transfer. The output from the horizontal CCD 13 is transferred through an amplifier 12 to the output terminal 10.

Figure 2:
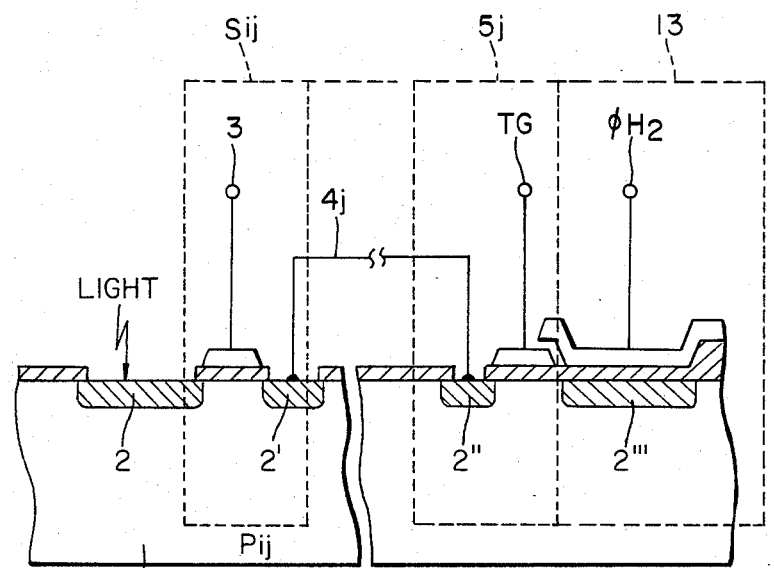
FIG. 2 shows in cross section the components thereof on enlarged scale.

In FIG. 2 are shown in cross section the photodiode $P_{ij}$, the transistor switch $S_{ij}$, the vertical signal line $4_j$, the transistor switch $5_j$ and a $\phi H_2$ clock phase stage of the horizontal shift register connected to them. Over the upper surface of a p-type semiconductor substrate 1 are formed n-type diffused regions 2, 2', 2" and 2‴ and an n-type diffused region which is an embedded region of the horizontal CCD. The pn junction between the substrate 1 and the n-type diffused region 2 constitutes a photodiode $P_{ij}$.

When a predetermined bias voltage is applied across the pn junction of the photodiode so as to accumulate charge and when light is incident at the pn junction after a charging circuit has been cut off, some accumulated charge is discharged by the carriers produced by the photoelectric effect. Thus, the charge corresponding to the incident light or light image pattern is accumulated.

The solid-state image sensor element with the aforementioned construction is driven by a prior art operating system as described below. First, the gate terminals TG of the transfer switches $5_1$ through $5_n$ are raised to a HIGH level. Then, the signal charge on the vertical signal lines $4_1$ through $4_n$ are entered or injected into the horizontal CCD 13. The end of the vertical signal line is connected to the n-type diffused region 2" which has a pn junction and the diffused region is not influenced by the electric fields so that is is impossible to transfer the charge from the vertical signal line to the horizontal CCD 13 within a brief time interval in an efficient manner. As a result, the solid-state image sensor of the type as shown in FIG. 1 or 2 has not been used in practice.

The present invention provides an improved drive system so that the above-stated solid-state image sensor element can be successfully used in practice.

Figure 3:
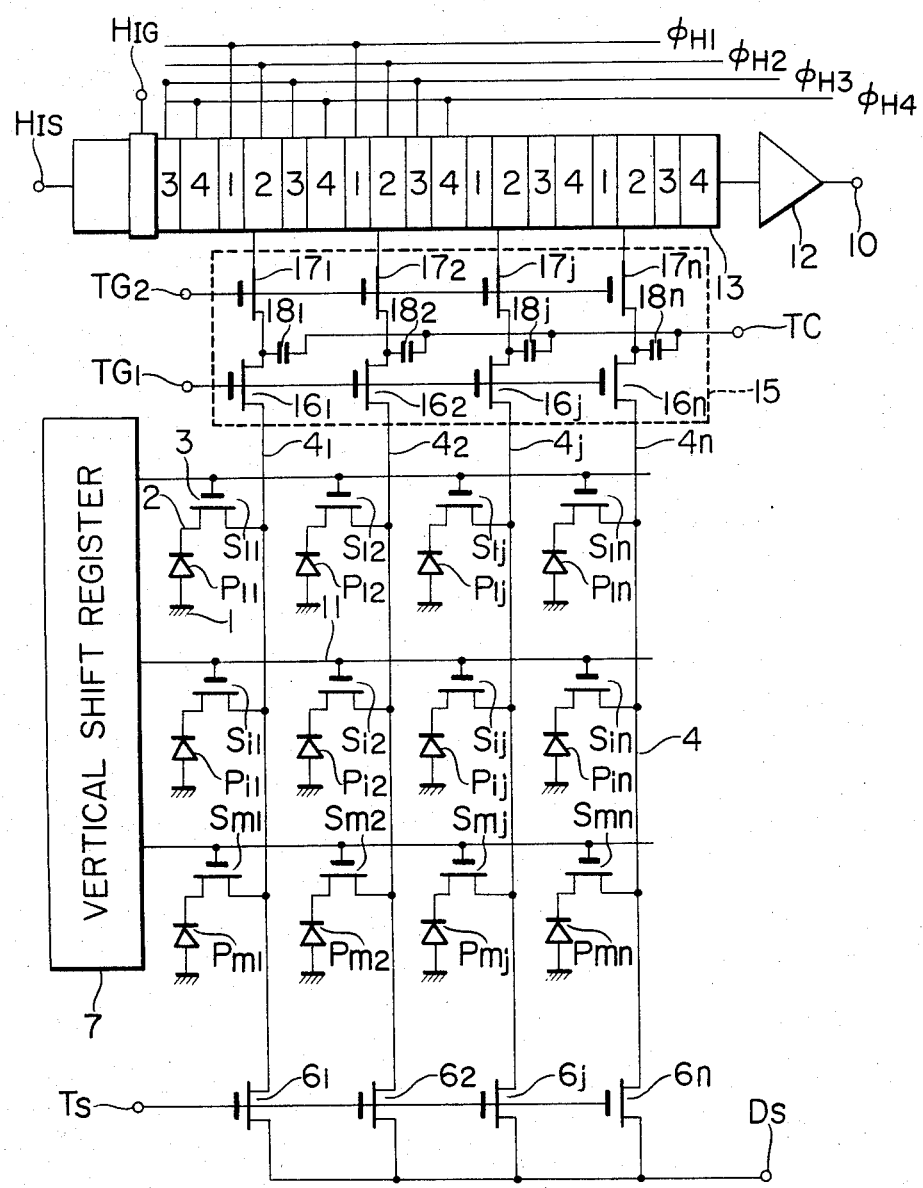
FIG. 3 is a diagrammatic view of another two-dimensional solid-state image sensor to which can be applied a driving method in accordance with the present invention.

In FIG. 3 is shown an another example of a solid-state image sensor element with which the drive method in accordance with the present invention can be used. The second example is similar to the solid-state image sensor element as shown in FIG. 1 or 2 except that a vertical charge transfer gate 15 is interconnected between the vertical signal lines $4_1$–$4_n$ and the horizontal CCD 13 so that the efficiency of the signal charge transfer may be increased.

The vertical charge transfer gate 15 comprises a first transistor switch array consisting of transistors $16_1$, $16_2$, ..., $16_j$, ..., and $16_n$ and a second transistor switch array consisting of transistors $17_1$, $17_2$, ..., $17_j$, ..., and $17_n$ and charge storages $18_1$, $18_2$, ..., $18_j$, ... and $18_n$.

Figure 4:
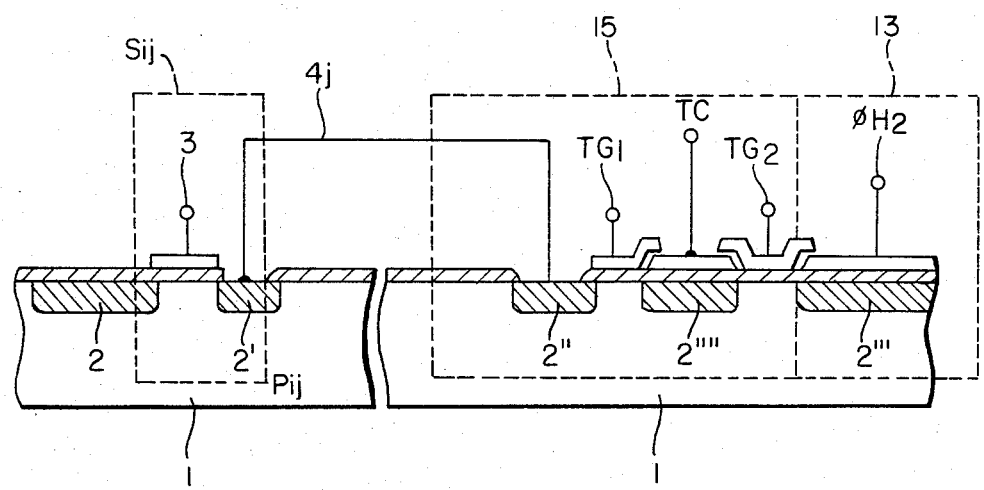
FIG. 4 shows in cross section the components thereof on enlarged scale.

In FIG. 4 is shown in cross section the vertical charge transfer gate 15, the horizontal CCD 13, the transistor switch $S_{1j}$ and the photodiode $P_{1j}$. The charge storage is made up of the diffused region 2"" immediately below the electrode TC and the substrate 1.

Figure 5:
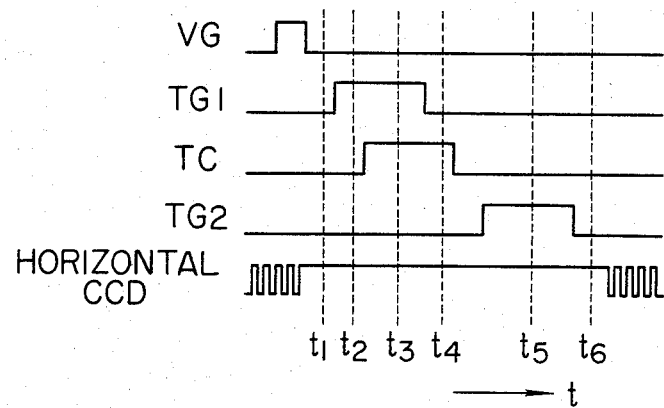
FIG. 5 is a timing diagram used for the explanation of the operation of the solid-state image sensor shown in FIG. 3 and shows the driving pulses applied to the gate terminal of a switch $S_{ij}$, the terminal TG1, TC and TG2 of a transfer gate and a horizontal CCD, respectively.

The solid-state image sensor element with the construction as shown in FIGS. 3 and 4 is driven by the prior art operating system as described below with reference to FIGS. 5 and 6. FIG. 5 is the timing diagram of drive pulses applied to the vertical charge transfer gate. Time is plotted along the abscissa, whereas the voltage along the ordinate. FIG. 6 shows the potential levels below the gates at $t_1$ through $t_6$ (See FIG. 5). It illustrates how the signal charge $Q_S$ on the vertical signal line 4 is transferred to the horizontal CCD 13 in response to the variations in potential levels. In response to the pulse VG applied from the vertical shift register 7 (See FIG. 5), the MOS transistor switches $S_{i1}$ through $S_{in}$ are turned on and the signal charge $Q_S$ from the photodiodes $P_{i1}$ through $P_{in}$ are transferred on to the vertical signal lines $4_1$ through $4_n$ ($t=t_1$). In order to read out the signal charge $Q_S$ efficiently, the internal bias charge $Q_p$ is injected from the charge storages $18_1$ through $18_n$ into the vertical signal lines $4_1$ through $4_n$ ($t=t_2$). Thereafter, the sum of charge; that is, $Q_S+Q_p$, is transferred to the charge storages $18_1$ through $18_n$ ($t=t_3$ and $t=t_4$). The operation from $t_1$ to $t_4$ is called a priming process. Next, only the signal charge $Q_S$ is transferred into the horizontal CCD 13 ($t=t_5$) while the internal bias charge $Q_p$ remains in the charge storages. Thus, the transfer of the signal charge $Q_S$ is completed ($t=t_6$). The operation from $t_5$ to $t_6$ is called the skimming process.

As described above, according to the prior art operating system, it is only the signal charge $Q_S$ that is transferred into the horizontal CCD. As a result, if the signal charge $Q_S$ is small in value, the charge-transfer inefficiency is enhanced. However, according to the present invention, the operating system is so improved that such charge-transfer inefficiency can be reduced to a minimum.

Briefly stated, according to the present invention, the above-described charge-transfer inefficiency is almost eliminated or reduced to a minimum by adding external bias charge as will be described in detail below.

Various methods for the injection of external charge may be suggested. For instance, external bias charge may be injected into the vertical lines by controlling the voltage at the gate $T_S$ and the voltage at the terminal $D_S$ in the solid-state image sensor element as shown in FIG. 1. However, it is almost impossible to inject external charge to every vertical signal line uniformly. That is, due to the variations in threshold voltage of MOS transistor switch $6_j$ and capacitance of the vertical signal line $4_j$, nonuniform injection of external bias charge leads to fixed vertical lines in the displayed picture. As described above, the conventional method for injecting external bias charge will inherently result in the formation of a fixed pattern.

According to the present invention, however, the horizontal CCD shift register is utilized so that the charge may be uniformly injected into all the vertical signal lines as will be described in detail below.

FIRST EMBODIMENT

The first embodiment of the present invention is a method for driving the solid-state image sensor element as shown in FIG. 1. Briefly stated, an injection means is employed so that in response to horizontal clock pulses, a predetermined bias charge is serially injected into the stages of the horizontal CCD 13. More specifically, a terminal $H_{IS}$ is provided for applying a suitable voltage to the diffused regions of the input injection means. The voltage at the terminal $H_{IS}$ and the potential at the control gate terminal $H_{IG}$ are so controlled that the transfer clock pulses are applied to the respective stages of the horizontal CCD 13 and consequently the same amounts of the bias charge $Q_B$ are injected into the respective stages. Thereafter, during the horizontal blanking period $T_{BLK}$, the bias charge $Q_B$ is added to the signal charge $Q_S$ on the vertical signal line 4 from the horizontal readout CCD shift register. Next, the sum $Q_S+Q_B$ is transferred into the horizontal readout CCD shift register. This operation will be described in more detail with reference to FIGS. 7 and 8A to 8E.

As seen from FIGS. 8A and 8B, the signal charge from the photodiodes in one row is transferred onto the vertical signal lines at $t_1$ in response to the pulse VG applied from the vertical shift register 7. The initial voltage $V_i$ at the vertical signal line $4_j$ and the diffused regions 2' and 2" (See FIG. 2) is dependent upon the high level $H_G$ at which the transistor switches $5_1$ through $5_n$ of the transfer gate TG remain. Next, the clock voltage $\phi H2$ (See FIG. 8C) is lowered to the low level $L_2$ so that the bias charge $Q_B$ accumulated in a potential well in the horizontal CCD can be transferred to the vertical signal lines $4_1$ through $4_n$. At $t_4$ clock $\phi H2$ rises again back to the high level so that both the bias charge $Q_B$ and the signal charge $Q_S$ are transferred into the horizontal CCD 13 as indicated in FIG. 8D. At $t=t_5$, the transfer gate electrode TG ($TG_1$ or $TG_2$) falls to the low level so that the readout from the horizontal CCD 13 is ready. Thereafter in response to the clocks $\phi H1$ through $\phi H4$ the contents in the horizontal CCD 13 appear at the output terminal 10.

Figure 7:
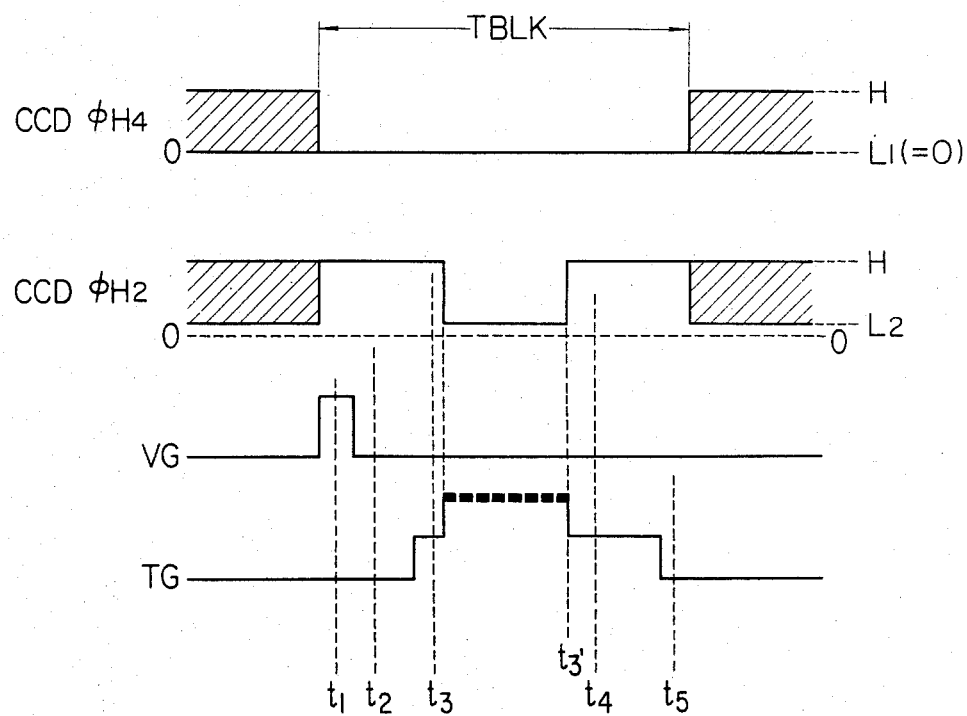
FIG. 7 is a view used for the explanation of a first embodiment of the present invention and is a timing diagram of driving pulses applied to various gates for transferring charges from vertical signal lines to the horizontal CCD.
Figure 10A:
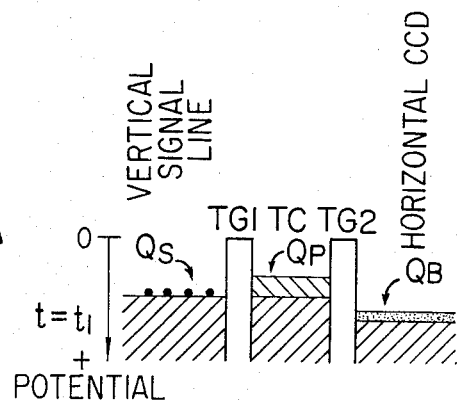
FIGS. 10A to 10G show the potential relationships among the vertical signal line, the transfer gate and the horizontal CCD at time points corresponding to $t_1$ through $t_7$ shown in FIG. 9.
Figure 10B:
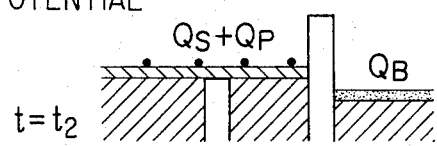
Figure 10C:
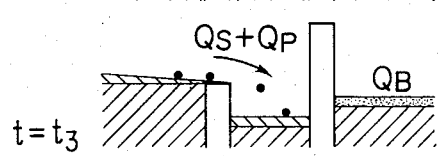
Figure 10D:
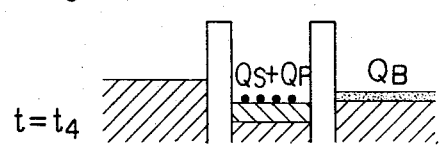
Figure 10E:
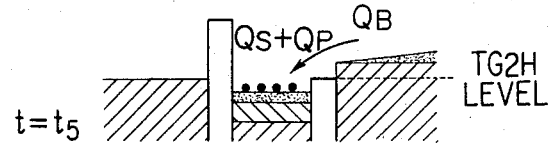
Figure 10F:
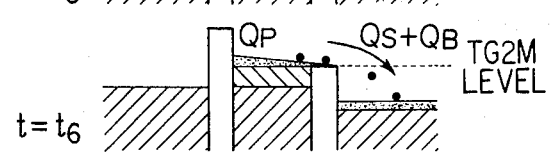
Figure 10G:
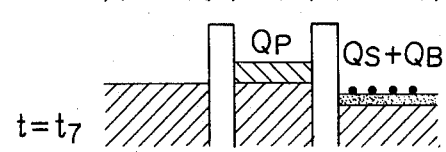

When the bias charge $Q_B$ which is accumulated in each stage (below the gate $\phi H2$ in FIG. 2) of the horizontal CCD is to be transferred to the corresponding vertical signal line and when the clock $\phi H2$ changes from the high level to the low level, the charge transfer from under the $\phi H$ gates to under other gates within the channel of the horizontal CCD 13 must be avoided. To this end, when the four-phase drive is employed, $\phi H2$ is maintained higher than $\phi H4$ by a few volts as shown in FIG. 7. The initial voltage $V_i$ of the vertical signal lines $4_1$ through $4_n$ is equal to the channel potential below the transfer gate electrode TG and is dependent on the final value of the high level $H_G$ in the case of transfer. In the case of transferring the bias charge $Q_B$ from the horizontal CCD 13 to the vertical signal lines $4_1$ through $4_n$, it is advantageous that the absolute value of H, that is, $|H|$ be maintained high so long as $|H_G| \leq |H|$ is satisfied, where H denotes the high level of the clock $\phi H2$. However, if $|H_G|$ remains at a high level, the absolute value $V_i$ also remains at a high value so that the overall efficiency for transferring the charge $Q_B + Q_S$ to the horizontal CCD 13 is decreased. Therefore, as indicated by the heavy broken lines in FIG. 8C and in FIG. 7, when $t_3 < t < t'_3$, the high level $H_G$ of the gate terminal TG is preferably maintained at the highest level of "the three states".

According to the above-described drive system, if the bias charge $Q_B$ is set to about 20% of the saturated amount of charge in the horizontal CCD, the minimum sensitivity can be improved to the order of 70 lux as compared with the minimum sensitivity of 200 lux attainable by the prior art drive system.

In addition, when the video output from the horizontal CCD is fed back to the diffused region voltage connected to, for instance, the terminals $H_{IG}$ and $H_{IS}$ of the input level control stage, the transfer efficiency can be automatically controlled in response to the variations of the intensity of incident light. Therefore, when the intensity of the incident or input light is high, the bias charge $Q_B$ can be automatically decreased so that the degradation in dynamic range due to the addition of the bias charge $Q_B$ can be avoided.

It is apparent that the present invention may be equally applied to the two-phase drive and other various input injection methods including the potential balancing method.

As described above, the system for driving the solid-state image sensor in accordance with the present invention can remarkably improve the signal-charge-transfer efficiency.

SECOND EMBODIMENT

Referring back to FIG. 3, the second embodiment of the present invention will be described which is an improvement described hereinbefore with reference to FIGS. 5 and 6A to 6F.

Briefly stated, the second embodiment is featured in that the bias charge injection is effected not only during the priming process but also during the skimming process, whereby the charge transfer efficiency during the skimming process or period can be improved.

Figure 9:
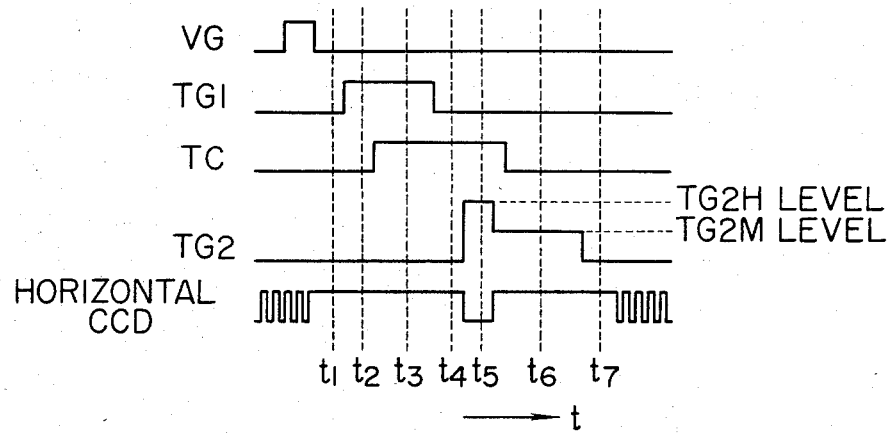
FIG. 9 is a timing diagram of driving pulses used for the explanation of a second embodiment of the present invention.

FIG. 9 is the timing diagram of the drive pulses for vertical transfer and FIGS. 10A to 10G show the potentials below gate electrodes at $t_1$ through $t_7$. The priming process from $t_1$ through $t_4$ is substantially similar to that described with reference to FIG. 6. In order to improve the charge transfer efficiency during the skimming process, the bias charge $Q_B$ which is injected from the horizontal charge injection terminals $H_{IS}$ and $H_{IG}$ into the horizontal CCD 13 is transferred to the charge storages $18_1$ through $18_n$ at $t_5$.

Of the charges $Q_S$, $Q_B$ and $Q_P$ accumulated in each of the charge storages $18_1$ through $18_n$, the charge $Q_S + Q_B$ is transferred into the horizontal CCD 13 by the skimming process at $t_6$.

The internal bias charge $Q_P$ remains in the charge storages $18_1$ through $18_n$ while the charge $Q_S + Q_B$ has been transferred into the horizontal CCD 13 as described above, whereby the horizontal readout is ready at $t_7$. Thereafter, following the procedure of the prior art operating system, the horizontal CCD 13 is driven in response to the clocks $\phi H1$ through $\phi H4$ so that the contents are shifted and appear at the output terminal 10.

In the second embodiment, the horizontal CCD 13 is of the embedded type and the transistor switches $17_1$ through $17_n$ are of EMOS construction. Therefore, in order to attain the highly efficient bias charge $Q_B$ transfer from the horizontal CCD 13 to the charge storages $18_1$ through $18_n$, the level TG2H of the TG2 gate at $t_5$ is maintained higher than the skimming level TG2M. The high level TG2H of the three state pulse to be applied on the TG2 gate is unnecessary in the case where the threshold voltage of the TG2 gate is lower by several volts than that of the TG1 gate.

Figure 11:
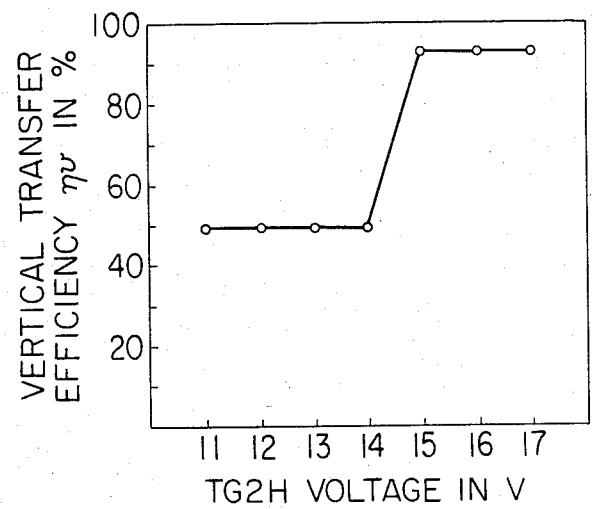
FIG. 11 shows the relationship between the potential at TG2H (abscissa) and the vertical charge transfer efficiency in the case of the second embodiment.

FIG. 11 shows the dependence of the vertical transfer efficiency on the TG2H level. The TG2H voltage is plotted along the abscissa, whereas the vertical transfer efficiency along the ordinate. ($\eta_v$: the aperture is stepped down by four steps from the saturated aperture.) It is seen that when TG2H is higher than 15 volts, the vertical transfer efficiency is remarkably improved. The reason is that the TG2 gate potential falls below the low level potential of the horizontal CCD so that the bias charge $Q_B$ is efficiently transferred into the charge storages in the horizontal CCD.

Figure 12:
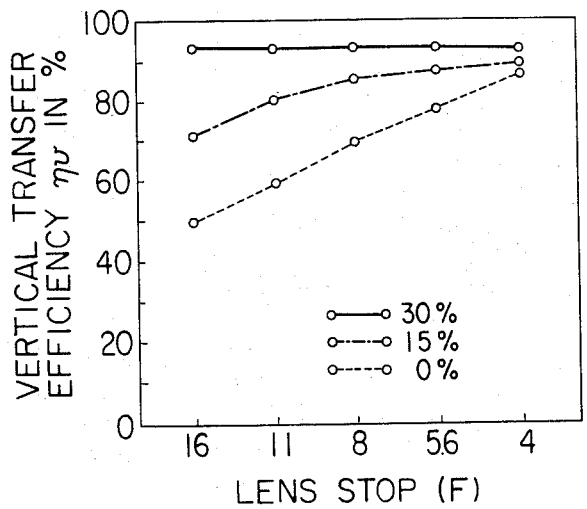
FIG. 12 shows the relationship between the intensity of incident light (abscissa) and the vertical charge transfer efficiency (ordinate), the intensity of the incident light being represented in terms of the lens stop (F), the solid-lie curve, the one-dot-chain curve and the broken-line curve showing the relationships when the bias charge is 30%, 15% and 0%, respectively, with respect to the saturation signal charge of a photosensor element.

FIG. 12 shows the dependence of the vertical transfer efficiency upon the intensity of the incident light. The lens stop (F) is plotted along the abscissa, whereas the vertical transfer efficiency along the ordinate. The broken-line curve shows the efficiency when the bias charge $Q_B$ is 0%; that is, when the prior art operating system is employed; the one-dot-chain-line curve shows the efficiency when the bias charge $Q_B$ is 15% of the saturated charge in the element (sic); and the solid-line curve shows the efficiency when the bias charge $Q_B$ is 30%. It is apparent that the injection of the bias charge $Q_B$ considerably improves the vertical transfer efficiency. If the bias charge exceeds 30%, the vertical transfer efficiency remains almost constant regardless of the intensity of the incident light.

Figure 13:
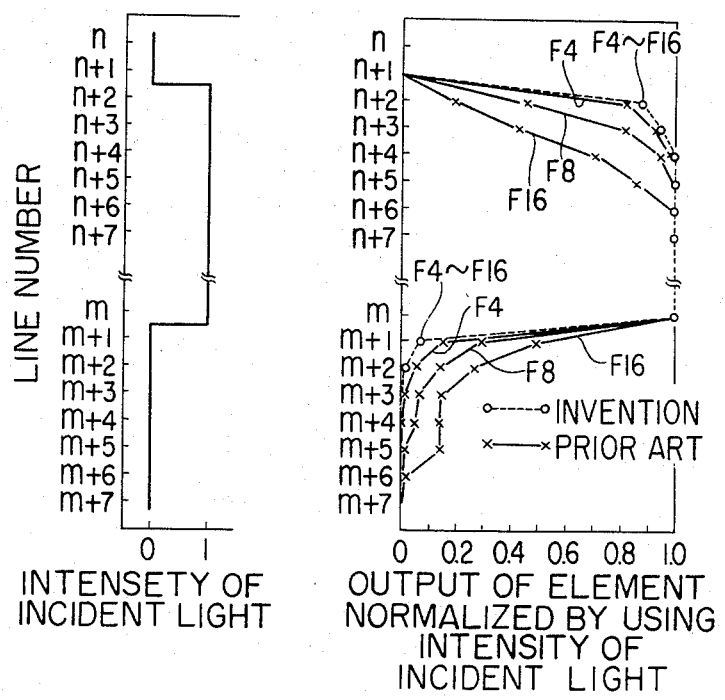
FIG. 13 shows the vertical waveform response dependence on the intensity of the incident light when a 3/10 V (where V is the height of the photosensor array) rectangular pattern of incident light (EIAJ-J chart) falls on the photosensor array.

FIG. 13 shows the dependence of the vertical waveform response on the intensity of the incident light when a rectangular light pattern (EIAJ-J chart) of 3/10

V (where V is the vertical length or height of the image receiving surface which comprises photodiodes $P_{ij}$ and switch $S_{ij}$). The line number is plotted along the ordinate whereas the intensity of the incident light along the abscissa. The output of the element normalized by using the intensity of the incident light is also plotted along the abscissa. According to the prior art operating system, the waveform response is dependent upon the intensity of the incident light, but according to the present invention, there exists no correlationship between the waveform response and the intensity of the incident light.

As described above, according to the present invention, the vertical transfer efficiency can be much improved during the skimming period so that the overall vertical transfer efficiency ($\eta_v$) can be remarkably increased.

What is claimed is:

1. In a solid-state image sensor of the type comprising
   (a) an array of photosensors disposed over one major surface of a semiconductor substrate,
   (b) an array of transistor switches disposed in one-to-one correspondence relationship with said photosensors,
   (c) a plurality of vertical signal lines for reading out the signal charges generated at said array of photosensors,
   (d) a horizontal readout charge-coupled device (CCD) shift register, and
   (e) a plurality of transfer gates equal in number to said plurality of vertical signal lines and interconnected between stages of said horizontal readout CCD shift register and said plurality of vertical signal lines, a driving method comprising the steps of:
   (A) injecting bias charges having an identical value into the stages, respectively, of said horizontal readout CCD shift register,
   (B) transferring signal charges from said array of photosensors to said vertical signal lines, respectively,
   (C) transferring said bias charges from said horizontal readout CCD shift register through said transfer gates to said vertical signal lines, respectively, thereby adding them to said signal charges, respectively,
   (D) transferring the sum of said signal and bias charges into said horizontal readout CCD shift register, and
   (E) driving said horizontal readout CCD shift register to supply said signal charges to an output terminal.

2. A driving method as set forth in claim 1 further comprising the step of
   controlling the amount of said bias charge to be injected into said horizontal readout CCD shift register in response to the output therefrom.

3. A driving method as set forth in claim 1 further comprising the step of
   employing a two-phase driving system for causing a shift of the signal charges through said horizontal readout CCD shift register to supply said signal charges to said output terminal.

4. A driving method as set forth in claim 1 further comprising the step of
   maintaining the level of a gate voltage of said transfer gates when said bias charges are transferred into said vertical signal lines at a higher level than the gate voltage when said signal and bias charges are transferred into said horizontal readout CCD shift register.

5. In a solid-state image sensor of the type comprising
   (a) an array of photosensors disposed upon one major surface of a semiconductor substrate,
   (b) an array of transistor switches disposed in one-to-one correspondence relationship with said photosensors, respectively,
   (c) a plurality of vertical signal lines for reading out the signal charges generated at said array of photosensors,
   (d) a horizontal readout charge-coupled device (CCD) shift reigster, and
   (e) a transfer gate section interconnected between transfer stages of said horizontal readout CCD shift register and said plurality of vertical signal lines, said transfer gate section comprising
   a first array of gates,
   a second array of gates, and
   an array of charge storage means,
   a driving method comprising the steps of:
   (A) transferring first bias charges having an identical value into the stages, respectively, of said horizontal readout CCD shift register,
   (B) transferring signal charges generated at said array of photosensors into said plurality of vertical signal lines, respectively,
   (C-1) adding said signal charges on said vertical signal lines to second bias charges, respectively, which are stored in said charge storage means, respectively, and transferring said signal charges plus said second bias charges to said charge storage means, respectively,
   (C-2) transferring said first bias charges from said horizontal readout CCD shift register into said charge storage means, respectively, in each of which are stored said signal charge plus said second bias charge,
   (D) transferring into said horizontal readout CCD shift register said signal and first bias charges out of said charge storage means in which said signal and first and second bias charges have been stored, and
   (E) driving said horizontal readout CCD shift register to supply said signal charges to an output terminal.

* * * * *